(12) United States Patent
Resto

(10) Patent No.: US 6,667,125 B2
(45) Date of Patent: Dec. 23, 2003

(54) FUEL CELL WITH FOLDED PROTON EXCHANGE MEMBRANE FORMING DIFFUSION LAYER SEAL

(75) Inventor: Javier Resto, Jacksonville, FL (US)

(73) Assignee: UTC Fuel Cells, LLC, South Windsor, CT (US)

( * ) Notice: Subject to any disclaimer, the term of this patent is extended or adjusted under 35 U.S.C. 154(b) by 84 days.

(21) Appl. No.: 10/021,717

(22) Filed: Dec. 12, 2001

(65) Prior Publication Data

US 2003/0108783 A1 Jun. 12, 2003

(51) Int. Cl.[7] .................................................. H01M 8/02
(52) U.S. Cl. ........................................................... 429/36
(58) Field of Search ....................................... 429/34–39

(56) References Cited

U.S. PATENT DOCUMENTS

| 5,470,671 A | * 11/1995 | Fletcher et al. ............... 429/26 |
| 5,837,395 A | 11/1998 | Breault et al. |
| 6,159,628 A | * 12/2000 | Grasso et al. ................. 429/35 |

* cited by examiner

*Primary Examiner*—Susy Tsang-Foster
(74) *Attorney, Agent, or Firm*—M. P. Williams

(57) ABSTRACT

A fuel cell (40) has a proton exchange membrane (41) having a rectangular central portion (42) and flaps (43–46) extending from the central portion. The flaps are wrapped around the cathode and anode substrates (14, 26) to provide respective edge seals therefor. A liquified adhesive adheres the flaps to the substrates and intervening filler material (33) so as to form a unitized electrode assembly.

4 Claims, 2 Drawing Sheets

FUEL CELL WITH FOLDED PROTON EXCHANGE MEMBRANE FORMING DIFFUSION LAYER SEAL

TECHNICAL FIELD

This invention relates to a proton exchange membrane (PEM) fuel cell in which the edge seals of the cathode and/or anode diffusion layers are formed by folding over corresponding portions of the membrane.

BACKGROUND ART

As is known, a PEM fuel cell has catalyst layers on the cathode and anode side of the membrane, possibly with optional diffusion layers formed as a coating on the cathode and anode substrates, respectively, which are on the non-membrane side of the cathode and anode catalysts. The substrates, also known as carbon papers, are highly porous, which may, for instance, have on the order of 70% porosity with pores on the order of 30 microns in diameter. In order to prevent the oxidant reactant gas (such as air) and the fuel reactant gas (such as a hydrogen containing gas) from escaping through the side edges (those edges not in communication with the respective manifolds) it has been known to provide edge seals to the anode and cathode substrates.

In FIG. 1, an exemplary PEM fuel cell 9, of the general type known to the prior art, includes a proton exchange membrane 11, an anode catalyst 12 which may comprise a coating on the membrane of on the order of 10 micron thickness, an anode substrate 14, which may, optionally, have an anode diffusion layer comprising a coating 15 on the order of 25 microns on the surface of the substrate 14. The fuel flow field may typically comprise an anode flow field water transport plate 18 having fuel reactant gas flow channels 19 therein and a degree of porosity to permit water, typically from a coolant flow channel (not shown), to be absorbed in the fuel reactant gas so as to provide moisture through the anode layers to the membrane 11. Similarly, on the cathode side, there is a cathode catalyst 22, there may be an optional cathode diffusion layer 23, a cathode substrate 26, and an oxidant reactant gas flow field, typically comprised of a cathode flow field water transport plate 27 having oxidant reactant gas flow field channels 28 therein. In FIG. 1, the fuel reactant gas manifold (not shown) will be in fluid communication with the fuel reactant gas flow field channels 19, and the oxidant reactant gas manifold (not shown) will be in fluid communication with the oxidant reactant gas flow field channels 28.)

Interfacial seals between the anode water transport plate 18 and the anode substrate 14, as well as between the cathode water transport plate 27 and the cathode substrate 26 may typically comprise beads of silicon rubber 31, 32, respectively.

To prevent gases from leaking from the substrate layers 14, 26, it is common to employ an edge seal 35, 36 which consists of a thermoplastic film such as polyvinylidene (KYNAR®), or an elastomer, such as a silicone rubber, extruded into the substrate. However, the extrusion process is carried out with only a single substrate at one time, and requires use of a hot laminating press, press shims, release films and a dwell time of minutes. The process therefore does not lend itself well to high speed production which would be required for low cost fuel cells suitable for use in vehicles.

Thermoplastic films 33 may be provided as fillers at the edges of the anode and cathode catalysts and optional diffusion layers.

Fuel cells of the type described with respect to FIG. 1 are illustrated in U.S. Pat. Nos. 6,020,083, 6,159,628, and 6,187,466.

DISCLOSURE OF INVENTION

Objects of the invention include: provision of an improved PEM fuel cell substrate gas edge seal; a PEM fuel cell substrate gas edge seal which can be provided on a high speed production basis; and a low cost and effective PEM fuel cell substrate gas edge seal.

According to the present invention, the proton exchange membrane of a PEM fuel cell is provided with at least one pair of flaps which are wrapped around the edges of the cathode substrate and/or the anode substrate of each fuel cell to provide a substrate edge seal.

According further to the invention, liquified adhesive may be applied to the membrane flaps before they are folded over the substrate so as to provide improved adhesion to the substrate and provide an improved substrate edge seal.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 2:
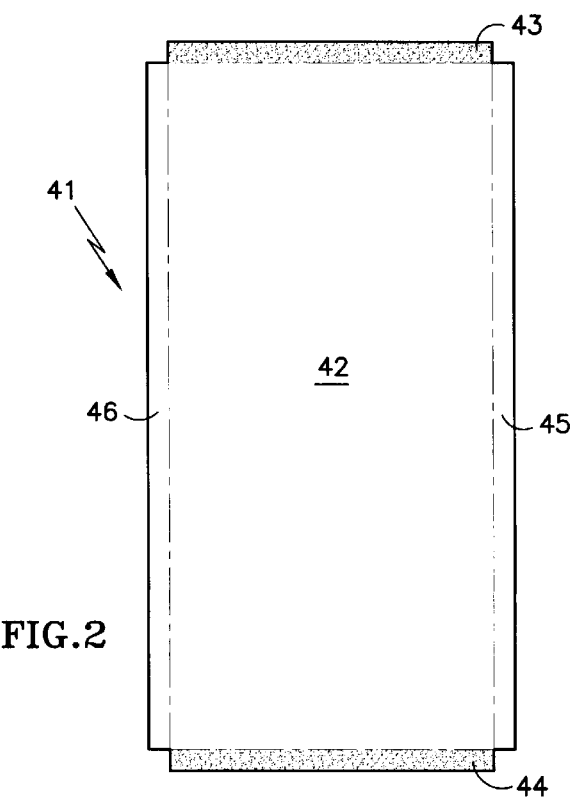
FIG. 2 is a top plan view of a proton exchange membrane of the invention.
Figure 3:
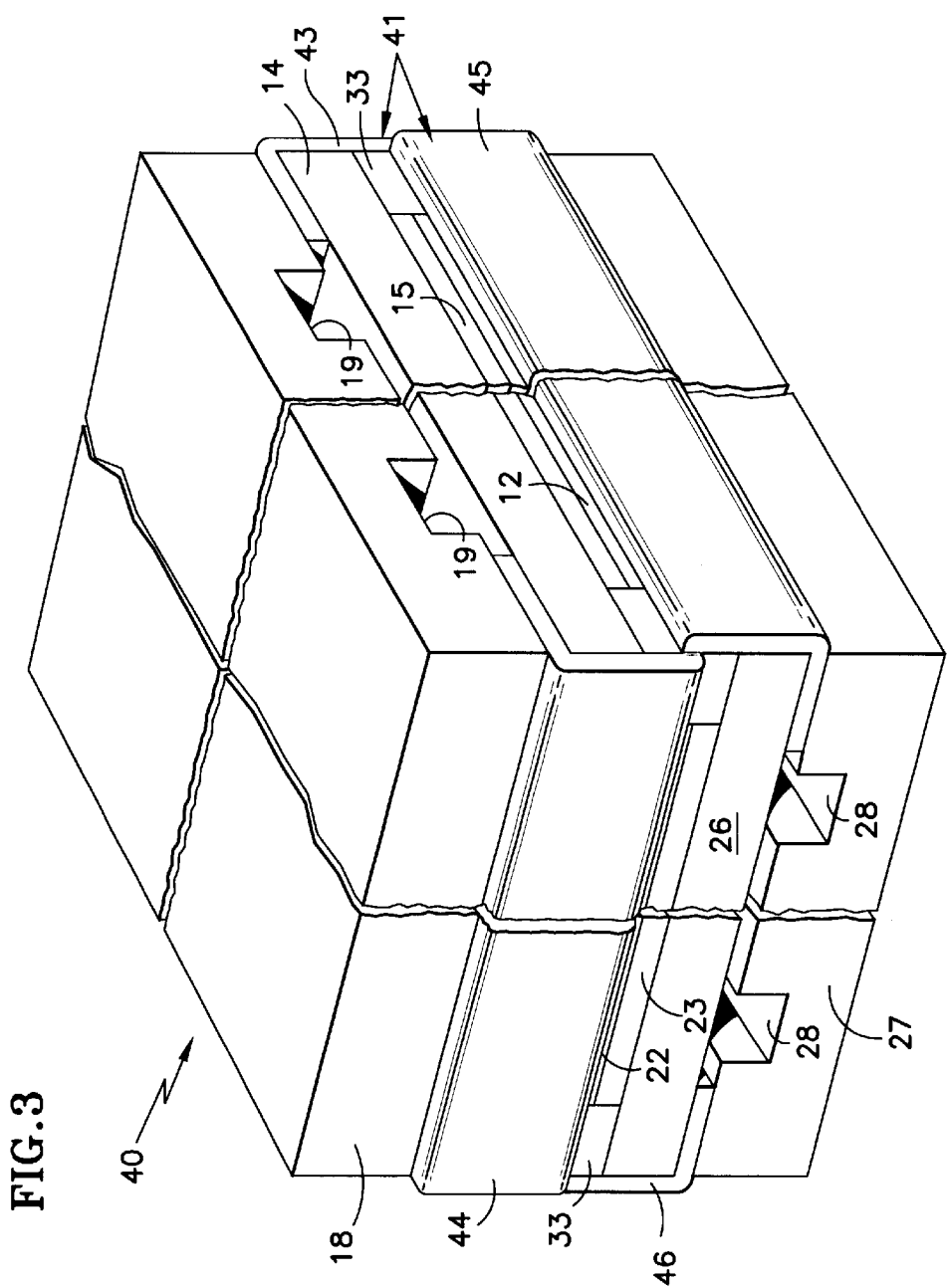
FIG. 3 is a simplified, partial perspective view of a fuel cell incorporating the invention.

Referring to FIG. 2, the proton exchange membrane 41 of the present invention has, in the embodiment of FIG. 2, a rectangular central section 42 having a first pair of opposing sides with flaps 43, 44 extending respectively therefrom, and a second pair of sides having flaps 45, 46 extending therefrom. The flaps 43, 44 will have a liquified adhesive applied to the upper surfaces thereof and the flaps 45, 46 will have liquified adhesive applied to the lower surfaces thereof, prior to being assembled with the substrates 14, 26, optional diffusion layers 15, 23 and plastic films 33, as shown in FIG. 3. In FIG. 3, the initially upper surfaces of the flaps 43, 44 are now adhered by the adhesive to the edges of the plastic film 33 and the anode substrate 14 and 26, as well as to the edges of the top surface of the anode substrate 14. The initially lower surface of the flaps 45, 46 are adhered in FIG. 3 to the edges of the plastic films 33 and the cathode substrate 26 as well as to the edges of the lower surface of the cathode substrate 26, by the liquified adhesive.

In a fuel cell stack 40 of the invention, FIG. 3, the anode substrate 14 has a surface, which is either the lower surface of the optional anode diffusion layer 15, if utilized in any embodiment of the invention, or otherwise is the actual lower surface of the anode substrate 14, which is in contact with the catalyst layer 12 of the membrane 41. Similarly, the cathode substrate 26 has a surface, which is either the upper surface of the optional cathode diffusion layer 23, if one is utilized in a given embodiment of the present invention, or is otherwise the upper surface of the cathode substrate 26, which is in contact with the cathode catalyst layer 22 of the membrane 41.

As shown in FIG. 3, spaces between layers are greatly exaggerated for clarity. Specifically, the thickness of the flaps 43–46, being the same thickness, of the rest of the membrane, on the order of 15 microns, does not prevent a substantially sealing relationship between the anode water transport plate 18 and the anode substrate 14 as well as between the cathode water transport plate 27 and the cathode substrate 26.

Figure 1:
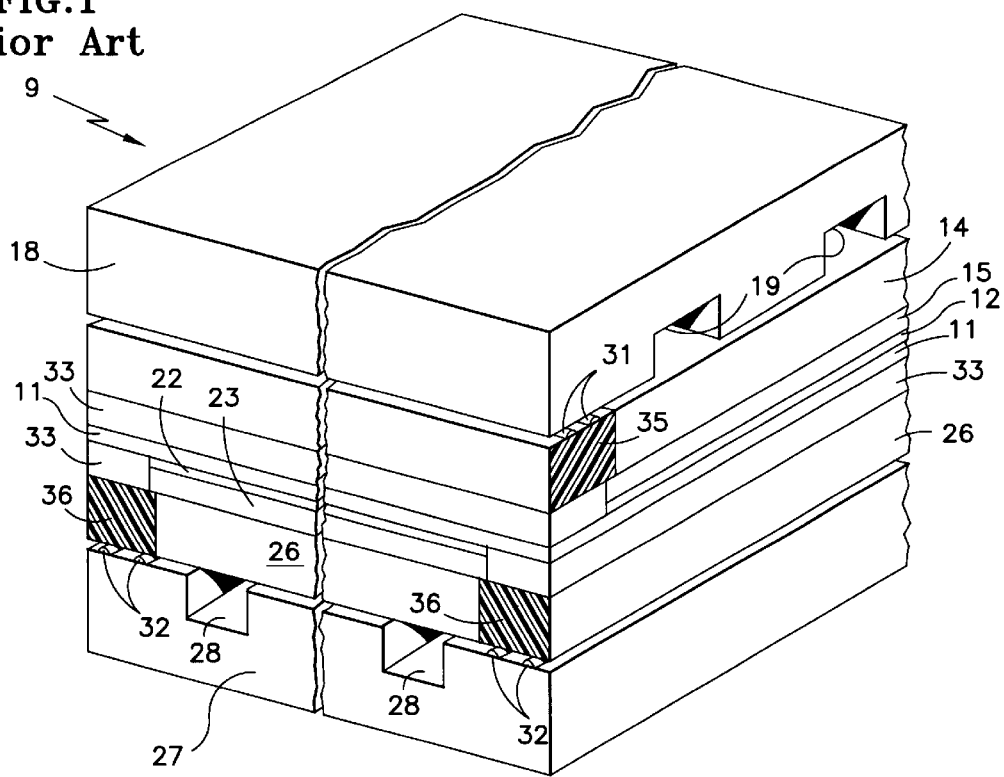
FIG. 1 is a simplified, partial, sectioned perspective view of a prior art PEM fuel cell.

By using adhesive on a portion of the upper surface of flaps 43 and 44 and on a portion of the lower surface of flaps 45 and 46, the invention also provides improved bonding between the substrates and the proton exchange membrane 41. Although not shown in FIG. 3, the adhesive on the portions may be the silicone rubber 32 (FIG. 1).

The invention may be used in fuel cell with a solid separator plate, instead of a porous cathode water transport plate 27, as is known.

The aforementioned patents are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A fuel cell comprising:

an anode substrate having a pair of opposed anode surfaces, each of said anode surfaces terminating a pair of opposed anode edges;

a cathode substrate having a pair of opposed cathode surfaces, each of said cathode surfaces terminating a pair of opposed cathode edges;

a rectangular proton exchange membrane disposed between the surfaces of said substrates and having first opposed edge flaps extending beyond the opposed surfaces of said anode substrate, said first flaps contacting said pair of opposed anode edges of said anode substrate in gas sealing relationship, and having second opposed edge flaps disposed between said first flaps and extending beyond the opposed surfaces of said cathode substrate, said second flaps contacting said pair of opposed cathode edges of said cathode substrate in gas sealing relationship.

2. A fuel cell according to claim 1 wherein said edge flaps are adhered to said substrates edges with adhesive.

3. A fuel cell, comprising:

a proton exchange membrane having a central rectangular portion with an anode catalyst in contact with one surface and a cathode catalyst in contact with the other surface;

an anode substrate having a first surface and either (a) said first surface contacting said anode catalyst or (b) a diffusion layer disposed on said first surface contacting said anode catalyst, said anode substrate having a second surface opposite said first surface;

a cathode substrate with having a third surface and having either (c) said third surface contacting said cathode catalyst or (d) a diffusion layer disposed on said third surface contacting said cathode catalyst, said cathode substrate having a fourth surface opposite said third surface;

a fuel reactant gas flow field directing flow of fuel reactant gas between two edges of said anode substrate;

an oxidant reactant gas flow field directing flow of oxidant reactant gas between two edges of said cathode substrate;

said membrane having first and second flaps extending from respective opposing sides of said central rectangular portion, and having third and fourth flaps extending from additional respective opposing sides of said central rectangular portion between said first and second flaps, each of said first and second flaps wrapped about a corresponding one of two remaining edges of said anode substrate in gas sealing relationship, and each of said third and fourth flaps wrapped about a corresponding one of two sides remaining edges of said cathode substrate in gas sealing relationship.

4. A fuel cell according to claim 3, further comprising:

said flaps joined to said substrates with adhesive.

\* \* \* \* \*